Figure 1:
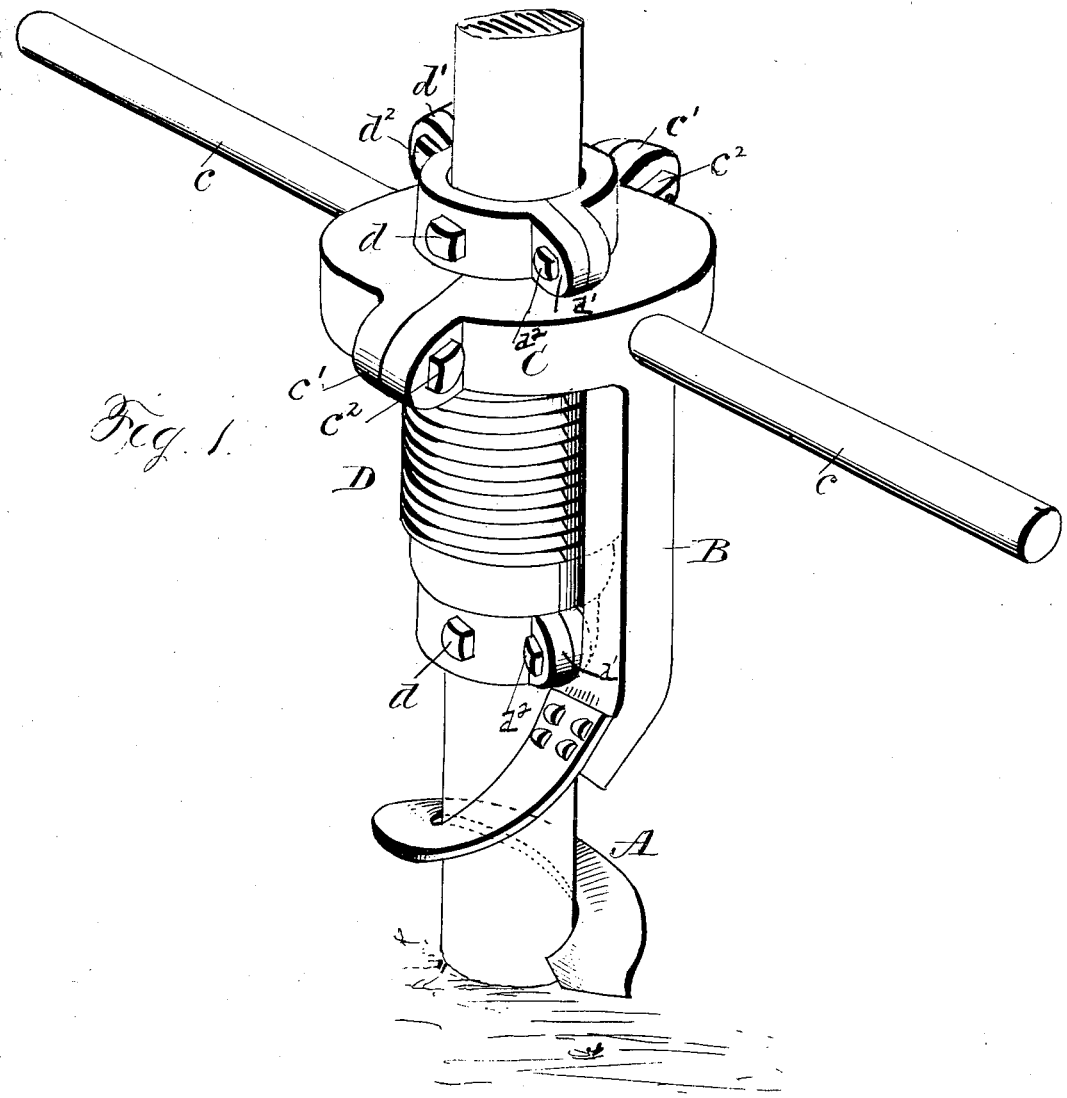

F. PALMER.
EARTH AUGER.
APPLICATION FILED AUG. 2, 1906.

936,350.

Patented Oct. 12, 1909.

2 SHEETS—SHEET 1.

Witnesses
C. A. Johnson
L. A. Skinner

Inventor
Floyd Palmer,
By Prindle and Williamson
Attorneys

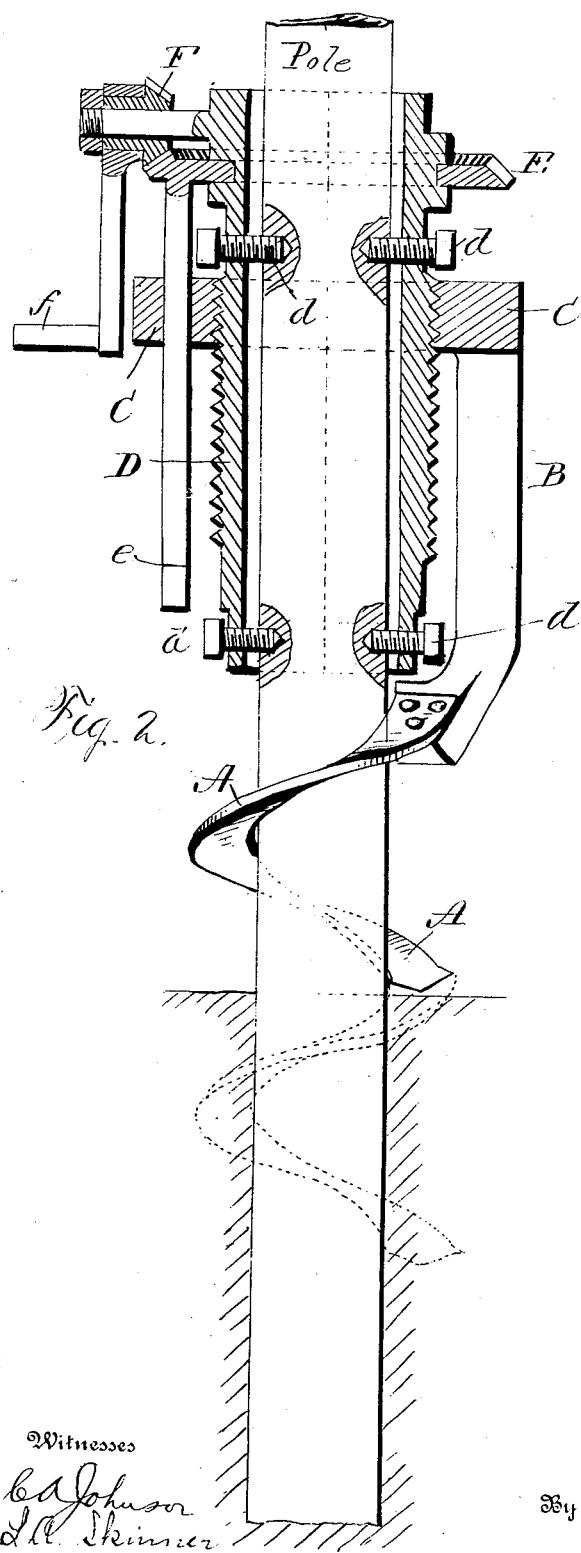

UNITED STATES PATENT OFFICE.

FLOYD PALMER, OF WASHINGTON, DISTRICT OF COLUMBIA.

EARTH-AUGER.

936,350. Specification of Letters Patent. Patented Oct. 12, 1909.

Application filed August 2, 1906. Serial No. 328,964.

*To all whom it may concern:*

Be it known that I, FLOYD PALMER, of Washington, in the District of Columbia, have invented a certain new and useful Improvement in Earth-Augers, and do hereby declare that the following is a full, clear, and exact description thereof, reference being had to the accompanying drawing, in which—

Figure 1 is a perspective view of apparatus embodying my invention; Fig. 2 is a vertical section, partly in elevation, of apparatus embodying my invention.

The object of my invention is to enable telegraph or other poles or posts after they have been erected or set to have their portions embedded in the earth covered or surrounded by a protecting medium which will prevent rotting or decay, and to such end, my invention consists in the apparatus substantially as hereinafter specified and claimed.

My invention, as illustrated in the drawings, consists of a screw or auger A whose internal diameter is such that it may readily be passed about the pole, and which may have only enough of a turn to enable it to be slipped sidewise over the pole and removed therefrom. At its upper end the screw or auger is attached to the lower end of a vertical arm B carried by a nut C that engages external thread on a tube or cylinder D that encircles the pole, the nut and tube being made in sections or halves bolted together for the convenient application to and removal thereof from the pole. The nut C has ears or lugs $c'$, through which pass clamping bolts $c^2$, and the tube or cylinder D has lugs $d'$, through which pass clamping bolts $d^2$. The nut is provided with handles $c$ by which it may be revolved to cause the revolution and axial movement of the screw or auger, or it may be constructed for connecting it to a suitable motor, so that it may be driven by power, if preferred. The threaded tube or cylinder is firmly secured to the pole by means of suitable holding or clamping devices applied thereto at the top and bottom thereof, and which, as shown, may consist of several radial bolts or screws $d$ that impinge upon or enter slightly the sides of the pole. With the cylinder and nut large enough for poles of greatest diameter, and by use of the bolts $d$ as clamps, the mechanism is fitted for use with poles of various sizes. The pitch of the thread of the tube or cylinder D is less than the pitch of the screw or auger A, so that the screw or auger by its revolution will exert a lifting effect upon the earth instead of merely screwing therethrough, as would be the case were the pitch of the cylinder thread and the pitch of the screw or auger the same. If preferred, however, the two may be given the same pitch, but this will necessitate the passing of the nut off the thread of the cylinder when the auger is screwed down into the ground, so that there may be thereafter independent revolution of the auger without its further descent which, of course, would result in the lifting of the earth.

Instead of connecting an operating arm directly to the nut, an arrangement of gears may be employed consisting of a bevel gear E journaled on an extension from the upper end of the threaded tube or cylinder D and having one or more rods $e$ that pass through holes in the nut, so that the rotation of the bevel gear may be imparted to the nut, and the latter moved in an axial direction without being accompanied by the bevel gear. For rotating the bevel gear, a bevel pinion F, provided with a crank $f$, may be provided.

The operation of my apparatus will be readily understood. The externally threaded tube or cylinder is firmly clamped to the pole a suitable distance above the ground, and then the nut is placed upon said tube or cylinder at the upper end thereof, the screw or auger being attached to the vertical arm of the nut. By revolving the nut, the screw or auger will be revolved about the pole, and it will descend into the earth about the embedded portion of the pole and remove the earth from about such embedded portion. Before applying the cement to the post, if desired, some wood preservative in a liquid form may be applied to the surface of the post, which, if desired, may also contain some material or agent for the destruction of insect life liable to be in the post.

Having thus described my invention, what I claim is:—

1. The combination of a post- or pole-encircling screw or auger, a bearing or support for said auger adapted to be mounted about the post or pole between the ends thereof, and means to rotate the screw or auger.

2. The combination of a post- or pole-encircling screw or auger, a bearing or support for said screw or auger, means to secure said bearing or support to the post or pole intermediate the ends thereof, and means to rotate the screw or auger.

3. The combination of a post- or pole-encircling screw or auger, and a bearing for the screw or auger made in separable sections laterally applicable to and removable from the pole or post, whereby it may be applied to the post or pole intermediate the ends thereof, and means to rotate the screw or auger.

4. The combination of a post or pole encircling screw or auger, a nut connected therewith, a threaded tube on which said nut is mounted, said nut and tube being formed of separable sections and means to rotate the nut.

5. The combination of a post or pole encircling screw or auger, a nut connected therewith, means whereby the nut may be rotated, a thread-carrying part for the nut, said part and said nut being applicable to and removable from a pole or post, and means for attaching the thread-carrying part to the pole or post.

6. In a machine for making an excavation about a post or pole, the combination of a rotatable earth-removing tool, and a support for such tool applicable to the post or pole intermediate the ends thereof.

7. In a machine for making an excavation about a post or pole, the combination of an earth-removing tool a suitable support for said tool adapted for attachment to the pole or post intermediate the ends thereof, and means for attaching said support to the pole.

8. In a machine for making an excavation about a post or pole, the combination of means for forming a chamber about the post or pole, and a suitable support for said means applicable to the post or pole intermediate the ends thereof.

9. In a machine for making an excavation about a post or pole, the combination of a suitable support intermediate the ends thereof, and means for attaching said support to the pole, and means mounted on said support for forming an annular chamber about the pole or post of substantially uniform diameter.

In testimony that I claim the foregoing I have hereunto set my hand.

FLOYD PALMER.

Witnesses:
F. J. EHLERS,
C. J. WILLIAMSON.